United States Patent [19]

Claycomb et al.

[11] Patent Number: 5,337,880
[45] Date of Patent: Aug. 16, 1994

[54] ARTICLE STORAGE CAROUSEL WITH AUTOMATIC CONVEYOR LOADING AND UNLOADING

[75] Inventors: Bruce A. Claycomb, Ortinville; Keith G. Opperthauser, Linden, both of Mich.

[73] Assignee: Automated Systems, Inc., Auburn Hills, Mich.

[21] Appl. No.: 97,371

[22] Filed: Jul. 23, 1993

[51] Int. Cl.$^5$ .............................................. B65G 1/00
[52] U.S. Cl. ................................. 198/347.3; 414/331
[58] Field of Search ........................... 198/347.3, 793; 414/331

[56] References Cited

U.S. PATENT DOCUMENTS

| | | | |
|---|---|---|---|
| 3,153,487 | 10/1964 | Hoellen | 214/16 |
| 3,360,100 | 12/1967 | Seragnoli | 198/24 |
| 3,661,284 | 5/1972 | Traube | 198/793 |
| 3,780,852 | 12/1973 | Weiss et al. | 198/793 |
| 4,178,113 | 12/1979 | Beaver et al. | 198/347.3 |
| 4,422,554 | 12/1983 | Lichti | 211/1.5 |
| 4,502,587 | 3/1985 | Clark | 198/347 |
| 4,561,820 | 12/1985 | Matheny III, et al. | 414/331 |
| 4,609,091 | 9/1986 | Dorner | 198/347 |
| 4,830,170 | 5/1989 | Rocke | 198/347.3 |
| 4,844,680 | 6/1989 | Kawata et al. | 414/331 |
| 4,890,718 | 1/1990 | Colamussi | 414/331 |
| 4,909,697 | 3/1990 | Bernard, II et al. | 414/331 |
| 4,983,091 | 1/1991 | Lichti, Sr. et al. | 414/331 |
| 5,038,909 | 8/1991 | Covert | 198/347.3 |
| 5,096,366 | 3/1992 | Bernard, II et al. | 414/786 |
| 5,097,936 | 3/1992 | Dorner et al. | 198/347.4 |
| 5,106,259 | 4/1992 | Anderson, et al. | 414/786 |
| 5,113,992 | 5/1992 | Sadamori | 198/347.3 |
| 5,176,242 | 1/1993 | Wegscheider | 198/347.3 |

Primary Examiner—Joseph E. Valenza
Attorney, Agent, or Firm—Basile and Hanlon

[57] ABSTRACT

An article storage carousel is disclosed featuring automatic conveyor loading and unloading. A conveyor is provided for transporting articles along a fixed path between an upstream location and a downstream location. A vertical carriage accumulates a plurality of articles for subsequent transfer to a temporary storage location. A storage carousel receives the plurality of articles for temporary storage and subsequent retrieval and discharge to the conveyor. If required, an alignment and guide housing can be provided between the vertical carriage and storage carousel to compensate for any slight vertical misalignment between the vertical carriage and storage carousel.

17 Claims, 3 Drawing Sheets

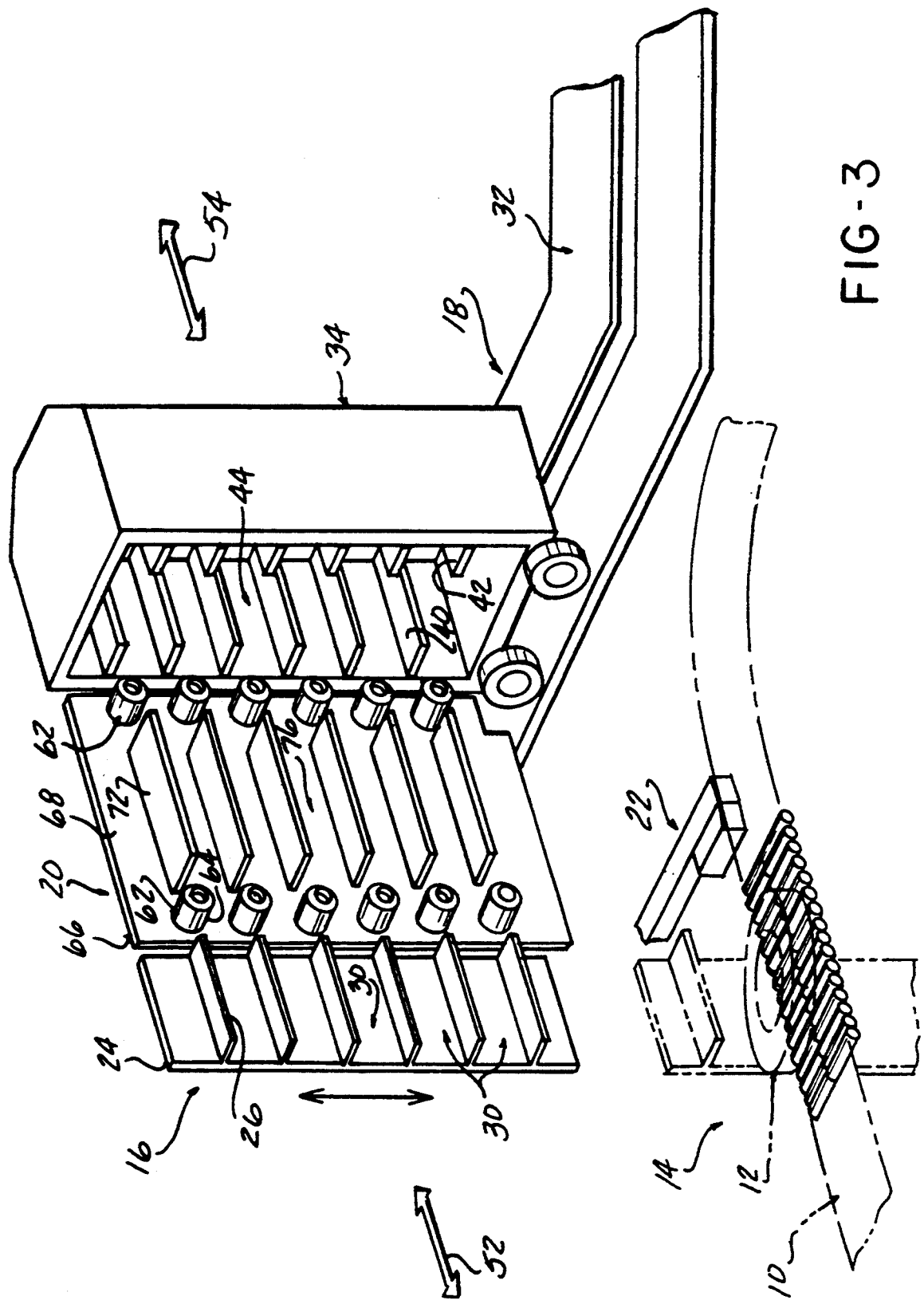

ARTICLE STORAGE CAROUSEL WITH AUTOMATIC CONVEYOR LOADING AND UNLOADING

FIELD OF THE INVENTION

The present invention relates to devices used to accumulate objects which are carried between an upstream location and a downstream location by a conveyor, and more particularly, the invention relates to an automated device which is capable of removing articles from a conveyor line, temporarily storing the articles and returning the articles to the conveyor line without operator intervention.

BACKGROUND OF THE INVENTION

Typically, systems of automatic storage and retrieval of inventory items are used in warehouse applications. All storage and retrieval systems attempt to reduce the time taken in placing inventory items in storage and to reduce the time taken in retrieving the inventory items from storage when desired. Small parts frequently cannot be palletized and often must be stored in bins or containers because of their size or delicate construction. Conventional storage and retrieval systems use solid storage shelves whereby an extractor or picking mechanism must go to the shelf to pick the desired inventory item. This limits the conventional system to essentially one transaction each time the extractor is operated and is not suited for placement in the middle of a high speed production line.

Efficient operation of a manufacturing facility requires that the upstream machinery continue to operate without interruption even though the downstream machinery may be experiencing down time. It is undesirable to stop and start the upstream machinery, because restarting the machine may be difficult, or for efficiency it may be desired to finish a production run. In addition, continuous operation will produce more product, since the down time for each machine will not be linked to, or added to, down time for other units.

In the past, upstream machines and other downstream machines have been linked close together requiring both machines to stop when either one does. In an attempt to provide some accumulation the operations have been spaced apart with the connecting conveyor providing brief accumulations. Thus, if operation of the downstream machine is interrupted, the upstream machine will merely add additional objects to the conveyor until the downstream machine is repaired. In some instances, serpentine conveyor paths have been used to receive products continuously from the upstream operation. Continuously adding more products to a serpentine conveyor which is not feeding to the downstream unit causes a continuous build-up of products on the conveyor and any associated problems that the build-up of products may entail. In addition, if the downstream unit is operating, the increased length of the serpentine conveyor path creates a delay between discharge from the upstream machine to receipt by the downstream machine.

One method has been proposed for accommodating a collection of articles being produced upstream, while the downstream processing unit is not in operation. These devices, generally called accumulators, are designed to pick up the articles which pass along a conveyor by lifting the edges which extend over the sides of the conveyor. This type of accumulator is generally used for objects which are flat and relatively long and wide compared to the height. These devices are typically limited in their capacity of accumulating objects by the vertical lift limit, typically the ceiling height in the assembly room, and therefore actual accumulation is limited to a relatively small number of objects.

SUMMARY OF THE INVENTION

Accordingly, it is desirable in the present invention to provide a device which is suitable for accumulating discrete articles which are carried between an upstream location and a downstream location while remedying the deficiencies of the prior known devices. Specifically, it is desirable in the present invention to eliminate the need for long, serpentine conveyors which use an inordinate amount of floor space. It is also desirable in the present invention to provide a machine for accumulating those articles in a manner which is suitable for use where ceiling height would otherwise limit the use of an accumulating device. It is further desirable in the present invention to provide a carousel automatic storage and retrieval system that can automatically remove articles from a conveyor for temporary storage and when appropriate can automatically retrieve articles for automated discharge to the conveyor for delivery downstream.

The article storage carousel of the present invention includes automatic conveyor loading and unloading. An article conveyor transports parts along a fixed path between an upstream location and a downstream location. A vertical article carriage accumulates a plurality of parts for subsequent transfer at a buffering station located between the upstream location and the downstream location. An article storage carousel receives the plurality of parts for temporary storage and subsequent discharge to the article conveyor.

The vertical article carriage or elevator is disposed upstream of a part stop. The part stop is movable between a first position obstructing free flow of articles along the conveyor and a second position allowing free flow of articles along the conveyor between the upstream location and the downstream location. The vertical article carriage or elevator includes opposing projections extending inwardly toward the conveyor forming generally horizontal, parallel shelves for engaging under a stopped article resting against the part stop. The shelves support each stopped article independent of the conveyor. The shelves are movable vertically in synchronized step to selectively capture articles from the conveyor and to selectively release articles back to the conveyor in sequential fashion. The article carriage or elevator moves vertically between a buffering position adjacent the conveyor and a transfer position spaced vertically above the conveyor.

An article alignment and guide housing is aligned with the article elevator at the transfer position and is used for transferring a plurality of articles captured by the elevator from the conveyor to a temporary storage location. The housing includes opposing ledges extending inwardly forming generally horizontal, parallel chambers with rollers adjacent each end of each chamber. Each roller has a cylindrical surface spaced slightly above an upper surface of the adjacent ledge so that the article tips upwardly slightly in the direction of travel as the article engages the roller during transferring from the housing or to the housing to compensate for any slight vertical misalignment between the housing and the elevator or the storage location.

A carousel storage system includes a continuous track that supports a plurality of part storage bins equally spaced thereabout. Each bin is driven in synchronized steps about the track in either rotational direction and is individually alignable with the housing on an opposite end from the vertical article elevator. Each bin has a plurality of inwardly extending, opposing surfaces forming generally horizontal, parallel temporary article storage location nests with an open vertical area extending through each nest and communicating with an aperture formed in a rear wall of each bin.

To transfer articles from the vertical carriage, a first pusher simultaneously engages the plurality of articles supported on the elevator at the transfer position and pushes the plurality of articles through the housing into an aligned storage bin for temporary storage of the articles. A second pusher is engageable through the aperture in the rear wall of each bin for simultaneously engaging a plurality of articles supported by the storage bin when aligned with the housing. The second pusher passes through the housing to push the plurality of articles through the housing onto the vertical elevator for subsequent sequential release to the conveyor.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a perspective view of the article storage carousel illustrated in FIGS. 1 and 2 with certain portions removed or not shown for clarity.

DETAILED DESCRIPTION OF THE PREFERRED EMBODIMENT

Figure 1:
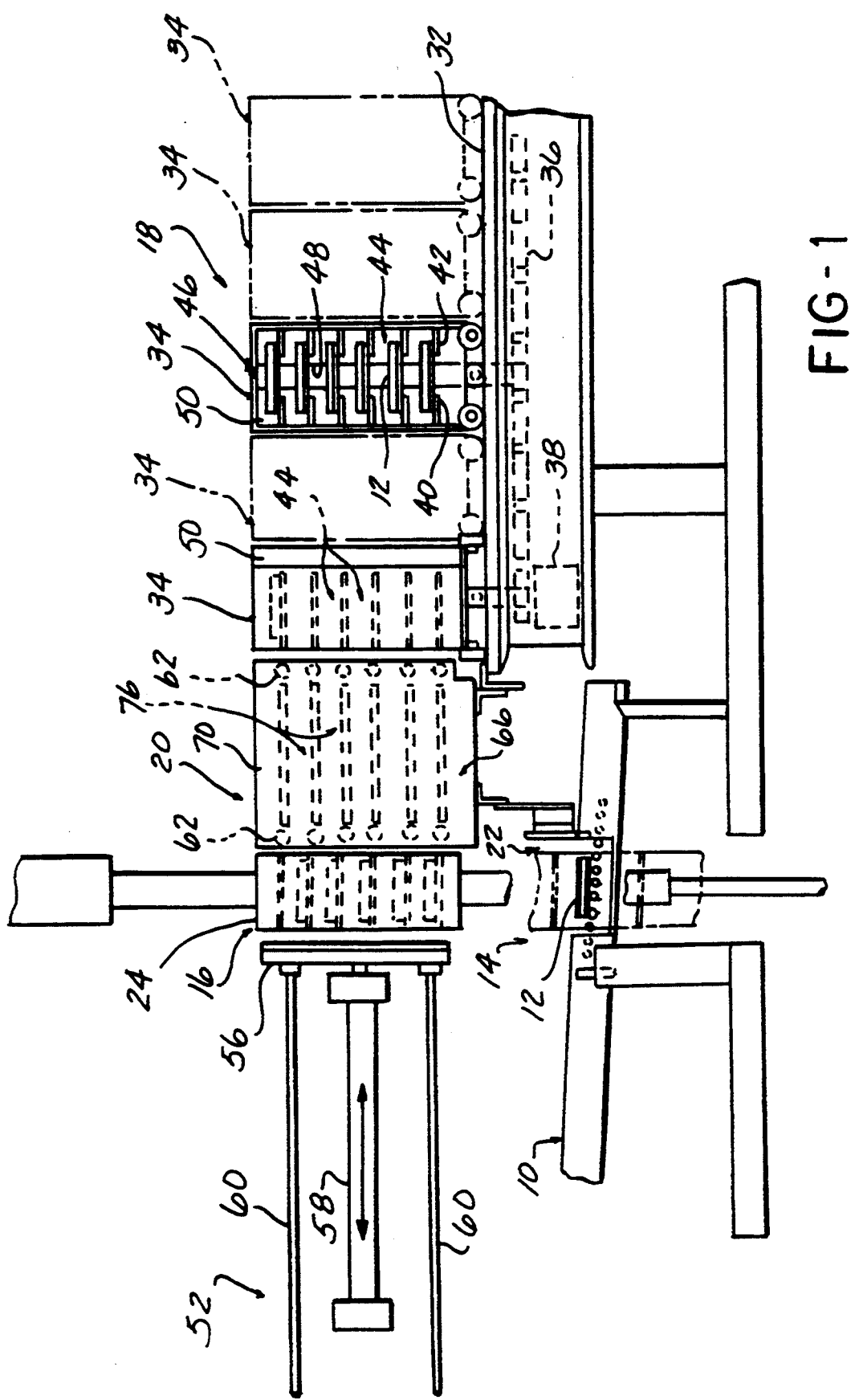
FIG. 1 is an elevational view of an article storage carousel with automatic conveyor loading and unloading in accordance with the present invention.
Figure 2:
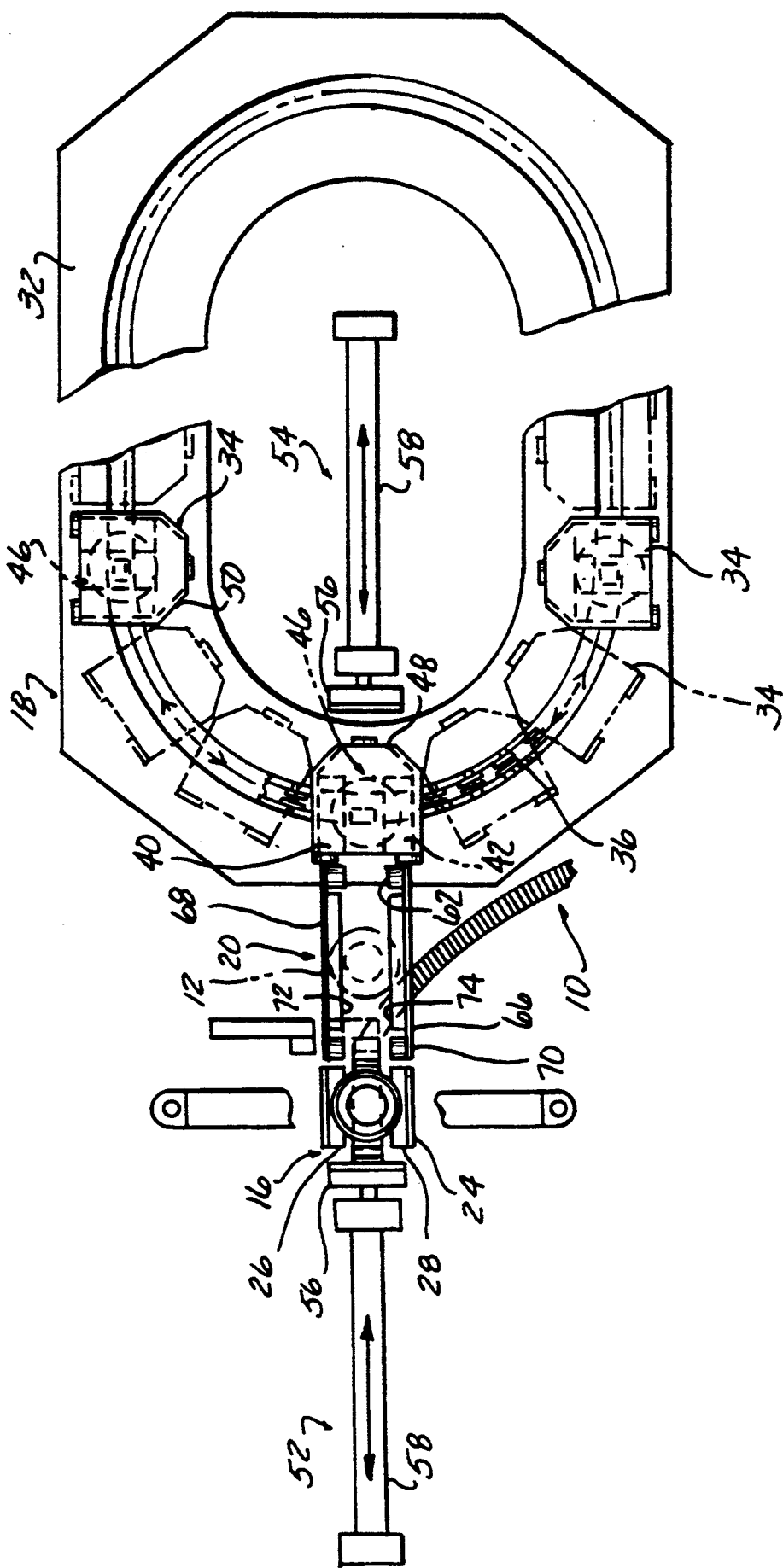
FIG. 2 is a plan view of the article storage carousel as illustrated in FIG. 1.

An article storage carousel with automatic conveyor loading and unloading according to the present invention is illustrated in FIGS. 1–3. Conveyor means 10 is provided for transporting parts or articles 12 along a fixed path between an upstream location and a downstream location. A buffering station 14 is located between the upstream location and the downstream location of the conveyor means 10. Vertical carriage or elevator means 16 is provided for accumulating a plurality of articles 12 for subsequent transfer to a temporary storage location. Storage carousel means 18 is provided for receiving the plurality of articles 12 for temporary storage and subsequent discharge to the conveyor means 10. Alignment and guide means 20 can be disposed between the elevator means 16 and carousel means 18 for aligning and guiding the articles 12 during transfer to the temporary storage location located on the storage carousel means 18 from the vertical carriage means 16, or from the temporary storage location in the storage carousel means 18 to the vertical carriage means 16.

In the preferred embodiment of the present invention, the vertical carriage means 16 can include stop means 22 located at a downstream end of the buffering station 14 and movable between a first position obstructing free flow of articles 12 along the conveyor means 10 and a second position allowing free flow of articles 12 along the conveyor means 10 through the buffering station 14. A vertical elevator 24 is disposed upstream of the stop means 22 and is in a position straddling the conveyor means 10. The elevator 24 has opposing projections 26 and 28 extending inwardly toward the conveyor means 10 forming generally horizontal, parallel shelves 30 for supporting engagement under a stopped article 12 resting against the stop means 22. Each shelf 30 is capable of supporting at least one stopped article 12 independent of the conveyor means 10. The shelves 30 are movable vertically in synchronized steps to selectively capture articles from the conveyor means 10, and to selectively release articles to the conveyor means 10 in sequential fashion. The elevator 24 is movable vertically between a lower buffering position adjacent the conveyor for capturing and releasing articles 12, and a transfer position spaced vertically above the conveyor means 10 for transferring the parts to a temporary storage location on the carousel means 18.

The storage carousel means 18 preferably includes a continuous track 32 supporting a plurality of storage bins 34 equally spaced about the track 32. Each bin 34 is driven in synchronized steps about the track 32 in either rotational direction and is individually alignable with the elevator 24 when in the transfer position. Each bin 34 can be connected to a drive chain 36 that is supported with respect to the track 32 for driving the storage bins 34. The drive chain 36 can be driven by an appropriate reversible motor means 38. Each bin 34 has a plurality of inwardly extending, opposing surfaces 40 and 42 forming generally horizontal, parallel nests 44 for temporary article storage. Preferably, each nest 44 has an open vertical area 46 communicating with an aperture 48 formed in a rear wall 50 of each bin 34.

Bin loader means 52 is provided for simultaneously engaging a plurality of articles supported by the elevator 24 at the transfer position for transfer into an aligned storage bin 34 for temporary storage of the articles 12. Bin unloader means 54 is engageable through the aperture 48 and the rear wall 50 of each bin 34 for simultaneously engaging a plurality of articles 12 supported in nests 44 by the storage bin 34 when aligned with the elevator 24 in the transfer position. The bin loader means 52 and the bin unloader means 54 may each include a vertically elongated pusher member 56 for simultaneously engaging a plurality of articles 12 held in either the elevator 24 or the storage bin 34. The pusher member 56 is actuated by connection to an extendable and retractable drive means 58, such as a fluid driven piston and cylinder combination, either hydraulic or pneumatic, or an electrically driven drive mechanism. Preferably, at least one guide rod 60 is provided to support and align the pusher member 56 as it passes between its first and second end limits of movement during retraction and extension.

In the preferred embodiment of the present invention, alignment and guide means 20 is provided to compensate for any slight vertical misalignment between the elevator 24 and the aligned storage bin 34. The alignment and guide means 20 preferably includes at least one roller 62 having a cylindrical surface 64 spaced slightly above an upper surface of the adjacent projection, 26 or 28, of the elevator 24 and the adjacent opposing surfaces, 40 or 42, of the storage bins 34. Preferably, the open vertical area 46 extends completely through the storage bins 34, the alignment and guide means 20 and the vertical elevator 24 allowing passage of the pusher member 56 completely through from one side to the other to accomplish loading and unloading of the articles 12 with respect to the storage bins 34. As the article 12 passes through the alignment and guide means 20, the forward, lower edge of the article engages the cylindrical surface 64 of the roller 62, such that the article tips upwardly slightly in the direction of travel during transfer to or from the storage bins 34 to compensate for any slight vertical misalignment between the storage bin 34 and the elevator 24. If desired, or required, the alignment and guide means 20 can be elongated longitudinally along the path of the articles 12. In this instance, the alignment and guide means 20 would include a housing 66 having vertically extending sides 68 and 70 for aligning and guiding the article 12 as it is driven along the transfer path. The housing 66 also includes a plurality of inwardly extending, opposing ledges 72 and 74 forming generally horizontal parallel chambers 76 with rollers 62 adjacent each end of each chamber 76. Each roller 62 has a cylindrical surface 64 spaced slightly above an upper surface of the adjacent projection 26 or 28 of the elevator, or slightly above the upper surface of the adjacent surface 40 or 42 of the storage bin 34. The cylindrical surface 64 of the rollers 62 is positioned above the adjacent structure so that the article 12 tips upwardly slightly in the direction of travel as the article 12 engages the roller 62 during transfer from the storage bin 34 or transfer to the storage bin 34, and also during transfer from the elevator 24 or to the elevator 24 from the housing 66 to compensate for any slight misalignment between the housing 66 or the storage bin 34.

In operation, articles 12 are normally carried down conveyor means 10 from an upstream location through the buffer station 14 to a downstream location. If a signal is received from the downstream location indicating that additional parts are not required, such as due to the downstream machine being down for repairs, the stop means 22 is moved from the second position, normally allowing free flow of parts along the conveyor means 10 to the first position 10 obstructing free flow of articles 12 along the conveyor means 10. As another article is transferred down the conveyor means 10 from the upstream location, the article 12 comes to rest against the stop means 22 in the first position. The vertical elevator 24 having previously been indexed to its lowermost position for receiving a first article 12 from the conveyor means 10 on its first or uppermost shelf 30. The vertical elevator 24 is indexed vertically upward a distance generally corresponding to the distance between the parallel shelves 30 so that the first article 12 is vertically positioned above the conveyor means 10 by a distance generally equal to the distance between the shelves 30, so that the next vertically lower shelf 30 is now in line with the conveyor means 10 for receiving a second article 12 when it comes to rest against the stop means 22. This procedure is continued until all of the shelves 30 have been filled with articles 12. If during this procedure, a signal is received from the downstream location that additional articles 12 are required, the stop means 22 can be moved from the first position to the second position to allow direct flow through passage of the articles 12 from the upstream location to the downstream location along the conveyor means 10. If in addition, a signal is received from the upstream location indicating that additional articles 12 are not available, such as if the upstream machine is down due to necessary repairs, the vertical elevator 24 can be indexed vertically downwardly to release the lowermost held captive article 12 for subsequent conveyance down the conveyor means 10 from the buffer station 14 to the downstream location. As additional articles 12 are required, further downwardly vertical indexing can be accomplished until all of the articles 12 have been released from the elevator 24. If additional buffering is required, in the instance of the downstream location not requiring additional articles 12, while the upstream location is continuing to supply articles 12, the vertical elevator 24 is moved from the lower buffering position to a transfer position spaced vertically above the conveyor means 10. When in the transfer position, the shelves 30 of the elevator 24 generally align horizontally with the nests 44 of a storage bin 34. The bin loading means 52 is actuated to engage the plurality of articles 12 with pusher member 56 as the pusher member 56 is moved from the retracted position to a completely extended position, thereby driving the articles 12 off from the shelves 30 of the elevator 24 into the aligned nests 44 of the storage bins 34. After loading the storage bin 34, the elevator 24 is returned to its lower buffering position to receive a first article 12 in the uppermost shelf 30 when it comes to rest against the stop means 22 as previously described. When a storage bin 34 has received articles 12 for temporary storage, the motor means 38 is activated to drive chain 36 to move the attached storage bins 34 rotationally about the continuous track 32. The storage bins are moved until the next immediately adjacent storage bin 34 is aligned with the transfer location of the elevator 24. When the shelves 30 of the vertical elevator 24 again become filled with articles 12 as previously described, the elevator is again moved from the buffering position to the transfer position for subsequently loading the second aligned storage bin 34. This process is continuing as long as is necessary in order to temporarily store the flow of articles 12 along the conveyor means 10 or until all of the storage bins 34 have been filled.

If some or all of the storage bins 34 have previously been filled with articles 12 for temporary storage, and the flow of articles 12 along the conveyor means 12 from the upstream location is interrupted due to down time for the upstream machine, articles 12 can now be supplied to the downstream location along the conveyor means 10 from the buffering station 14. First, any articles 12 that are currently temporarily stored on shelves 30 of the vertical elevator 24 are sequentially released to the conveyor means as previously described. When the vertical elevator 24 is empty, it is moved from the buffering position to the transfer position in vertical alignment with a filled storage bin 34. Bin unloading means 54 is actuated causing pushing member 56 to pass through the aperture 48 and the rear wall 50 of the storage bin 34 to engage the plurality of articles 12 temporarily stored within the nests 44. As the pusher member 56 is further driven from the retracted position to the fully extended position, the pusher member 56 passes through the open vertical area 46 existing in the storage bin 34, alignment and guide means 20 and vertical elevator 24 to transfer the articles 12 from the nests 44 to the shelves 30. After receiving the articles 12 in the vertical elevator 24, the vertical elevator is moved from the transfer position to the buffer position with the lowermost shelf generally aligned with the conveyor means 10 to release the lowermost article 12 to the conveyor means 10. After release of the lowermost article 12, the vertical elevator 24 is sequentially driven incrementally downward a distance generally equal to the distance between the shelves 30 to sequentially release corresponding articles 12 held on each subsequent shelf to the conveyor means 10 until the uppermost article 12 is released to the conveyor means 10 and the vertical elevator 24 is empty. When empty, as previously described, the vertical elevator 24 is moved from the buffering position to the transfer position and the storage bins 34 are moved by activation of the motor means and drive chain 36 to align a full storage bin 34 with the vertical elevator in the transfer position. The bin unloader means 54 is then actuated again to unload the articles 12 temporarily stored within the storage bin 34 onto the vertical elevator 24 for subsequent release to the conveyor means 10. This procedure is continued until the demand for articles 12 at the downstream location of the conveyor means 10 is satisfied or until all of the storage bins 34 have been emptied of articles 12, or until the articles 12 are again supplied from the upstream location of the conveyor means 10 directly through the buffering station to the downstream location.

Control means (not shown) are provided for controlling the operation of the elevator means 16, stop means 22, motor means 38, bin loading means 52 and bin unloading means 54 in response to signals received from the upstream location corresponding to the supply of articles 12 along conveyor means 10 and a downstream signal corresponding to the need to deliver articles 12 to the downstream portion of the conveyor means 10. If the upstream signal indicates that articles 12 are not being supplied to the conveyor means 10, the elevator means 16 and storage carousel means 18 is controlled as described above to supply articles 12 from their temporary storage nests 44 in the storage bins 34 by loading onto the vertical elevator 24 for subsequent discharge to the conveyor means 10. If the downstream signal indicates that articles 12 are no longer required to be delivered to the downstream location of the conveyor means 10, the control means switches to place the present invention in a buffering mode to collect articles 12 supplied from the upstream side of the conveyor means 10 in the vertical elevator 24, and when full to transfer the articles 12 from the vertical elevator 24 to the temporary storage nests 44 within the storage bins 34. When the upstream signal indicates that articles 12 are being supplied to the conveyor means 10, and when the downstream signal indicates that articles 12 are required at the downstream location of the conveyor means 10, the control means places the present invention in a standby mode allowing the articles to pass directly through the buffering station 14 from the upstream location to the downstream location without interference. The present invention can remain in the standby mode indefinitely, and can be switched between the supplying mode and the buffering mode without any need to reset the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An article storage carousel with automatic conveyor loading and unloading comprising:
   conveyor means for transporting articles along a fixed path between an upstream location and downstream location;
   vertical carriage means for accumulating a plurality of articles for subsequent transfer to a temporary storage location; and
   storage carousel means for receiving said plurality of articles and for storing said articles temporarily subsequent to discharge of said articles to said conveyor means.

2. The article storage carousel of claim 1 further comprising:
   alignment and guide means for transferring said plurality of articles captured by said carriage means from said conveyor means to said carousel means.

3. The article storage carousel of claim 2 wherein said alignment and guide means further comprises:
   at least one roller disposed between said carriage means and said carousel means such that said article tips upwardly slightly in a direction of travel as said article engages said roller during transferring from said carriage means to said carousel means and during transferring from said carousel means to said carriage means to compensate for any slight vertical misalignment.

4. The article storage carousel of claim 2 wherein said alignment and guide means further comprises:
   an alignment and guide housing for transferring said plurality of articles captured by said carriage means from said conveyor means to a temporary storage location, said housing aligned with said carriage means and having a plurality of inwardly extending, opposing ledges forming generally horizontal, parallel chambers with rollers adjacent each end of each chamber, each roller having a cylindrical surface such that said article tips upwardly slightly in a direction of travel as said article engages said roller during transferring from and to said housing to compensate for any slight vertical misalignment between the housing and the carriage means or the carousel means.

5. The article storage carousel of claim 1 wherein said carriage means further comprises:
   a vertical elevator disposed straddling said conveyor means, said elevator having opposing projections extending inwardly toward said conveyor means forming generally horizontal, parallel shelves for engaging under an article, said shelves for supporting said article independent of said conveyor means, said shelves movable vertically in synchronized steps to selectively capture from or release to said conveyor means a plurality of articles in sequential fashion, said elevator movable vertically between a buffering position adjacent said conveyor means and a transfer position spaced vertically above said conveyor means.

6. The article storage carousel of claim 1 further comprising:
   stop means disposed generally transverse to said conveyor means and movable between a first position obstructing free flow of articles along said conveyor means and a second position allowing free flow of articles along said conveyor means.

7. The article storage carousel of claim 1 wherein said carousel means further comprises:
a continuous track supporting a plurality of storage bins equally spaced thereabout, each bin driven in synchronized steps about said track and individually alignable with said carriage means, each bin having a plurality of inwardly extending, opposing surfaces forming generally horizontal, parallel nests for temporarily storing said articles, each bin having an open vertical area through each nest communicating with an aperture formed in a rear wall of each bin.

8. The article storage carousel of claim 7 further comprising:
bin loading means for simultaneously engaging a plurality of articles supported by said carriage means for transferring into an aligned storage bin for temporary storage of said articles.

9. The article storage carousel of claim 7 further comprising:
bin unloading means for simultaneously engaging a plurality of articles supported by said storage bin when aligned with said carriage means for transferring to said carriage means for subsequent sequential release to said conveyor means.

10. An article storage carousel with automatic conveyor loading and unloading comprising:
conveyor means for transporting articles along a fixed path between an upstream location and downstream location;
vertical carriage means for accumulating a plurality of articles for subsequent transfer to a temporary storage location;
storage carousel means for receiving said plurality of articles and for storing said articles temporarily subsequent to discharge of said articles to said conveyor means, said carousel means including a continuous track supporting a plurality of storage bins moveable about said continuous track, each bin moveable selectively into alignment with said carriage means;
alignment and guide means for guiding said plurality of articles during transfer to said carousel means from said carriage means;
stop means disposed generally transverse to said conveyor means and movable between a first position obstructing free flow of articles along said conveyor means allowing capturing and accumulation of stopped articles with said carriage means and a second position allowing free flow of articles along said conveyor means;
bin loading means for simultaneously engaging a plurality of articles supported by said carriage means for transferring into an aligned storage bin for temporary storage of said articles; and
bin unloading means for simultaneously engaging a plurality of articles supported by said storage bin when aligned with said carriage means for transferring said plurality of articles to said carriage means for subsequent sequential release to said conveyor means.

11. The article storage carousel of claim 10 wherein said alignment and guide means further comprises:
at least one roller disposed between said carriage means and said carousel means such that said article tips upwardly slightly in a direction of travel as said article engages said roller during transferring from said carriage means to said carousel means and during transferring from said carousel means to said carriage means to compensate for any slight vertical misalignment.

12. The article storage carousel of claim 10 wherein said alignment and guide means further comprises:
an alignment and guide housing for transferring said plurality of articles captured by said carriage means from said conveyor means to a temporary storage location, said housing aligned with said carriage means and having a plurality of inwardly extending, opposing ledges forming generally horizontal, parallel chambers with rollers adjacent each end of each chamber, each roller having a cylindrical surface such that said article tips upwardly slightly in a direction of travel as said article engages said roller during transferring from and to said housing to compensate for any slight vertical misalignment between the housing and the carriage means or the carousel means.

13. The article storage carousel of claim 10 wherein said carriage means further comprises:
a vertical elevator disposed straddling said conveyor means, said elevator having opposing projections extending inwardly toward said conveyor means forming generally horizontal, parallel shelves for engaging under an article, said shelves for supporting said article independent of said conveyor means, said shelves movable vertically in synchronized steps to selectively capture from or release to said conveyor means a plurality of articles in sequential fashion, said elevator movable vertically between a buffering position adjacent said conveyor means and a transfer position spaced vertically above said conveyor means.

14. The article storage carousel of claim 10 wherein said carousel means further comprises:
a continuous track supporting a plurality of storage bins equally spaced thereabout, each bin driven in synchronized steps about said track and individually alignable with said carriage means, each bin having a plurality of inwardly extending, opposing surfaces forming generally horizontal, parallel nests for temporarily storing said articles, each bin having an open vertical area through each nest communicating with an aperture formed in a rear wall of each bin.

15. The article storage carousel of claim 10 wherein said bin loading means further comprises:
a first vertically extending push member engageable with a plurality of articles supported by said carriage means and moveable from a retracted position clear of said carriage means to an extended position passing through said carriage means and said alignment and guide means to deposit said plurality of articles in said aligned storage bin of said carousel means.

16. The article storage carousel of claim 10 wherein said bin unloading means further comprises:
a second vertically extending push member engageable with a plurality of articles supported by an aligned storage bin of said carousel means and moveable from a retracted position clear of said aligned storage bin means to an extended position passing through said aligned storage bin and said alignment and guide means to deposit said plurality of articles in said carriage means.

17. An article storage carousel with automatic conveyor loading and unloading comprising:
- a conveyor for transporting articles along a fixed path through a buffering station between an upstream location and a downstream location;
- a stop disposed at a downstream end of said buffering station and movable between a first position obstructing free flow of articles along said conveyor and a second position allowing free flow of articles along said conveyor;
- a vertical elevator disposed upstream of said stop straddling said conveyor, said elevator having opposing projections extending inwardly toward said conveyor forming generally horizontal, parallel shelves for engaging under a stopped article resting against said stop, said shelves for supporting each said stopped articles independent of said conveyor, said shelves movable vertically in synchronized steps to selectively capture from or release to said conveyor a plurality of articles in sequential fashion, said elevator movable vertically between a buffering position adjacent said conveyor and a transfer position spaced vertically above said conveyor;
- an alignment and guide housing for transferring said plurality of articles captured by said elevator from said conveyor to a temporary storage location, said housing aligned with said elevator at said transfer position and having a plurality of inwardly extending, opposing ledges forming generally horizontal, parallel chambers with rollers adjacent each end of each chamber, each roller having a cylindrical surface spaced slightly above an upper surface of the adjacent ledge such that said article tips upwardly slightly in the direction of travel as said articles engages said roller during transferring from and to said housing to compensate for any slight vertical misalignment between the housing and the elevator or the storage location;
- a carousel storage system having a continuous track supporting a plurality of storage bins equally spaced thereabout, each bin driven in synchronized steps about said track and individually alignable with said housing, each bin having a plurality of inwardly extending, opposing surfaces forming generally horizontal, parallel nests for temporarily storing said articles, each bin having an open vertical area through each nest communicating with an aperture formed in a rear wall of each bin;
- a first pusher for simultaneously engaging a plurality of articles supported by said elevator at said transfer position for passage through said housing into an aligned storage bin for temporary storage of said articles; and
- a second pusher engageable through said aperture for simultaneously engaging a plurality of articles supported by said storage bin when aligned with said housing for passage through said housing onto said elevator when in said transfer position for subsequent sequential release to said conveyor.

* * * * *